No. 751,374. PATENTED FEB. 2, 1904.
G. M. BRIGHT.
FASTENING MEANS FOR HOES.
APPLICATION FILED JULY 9, 1903.
NO MODEL.
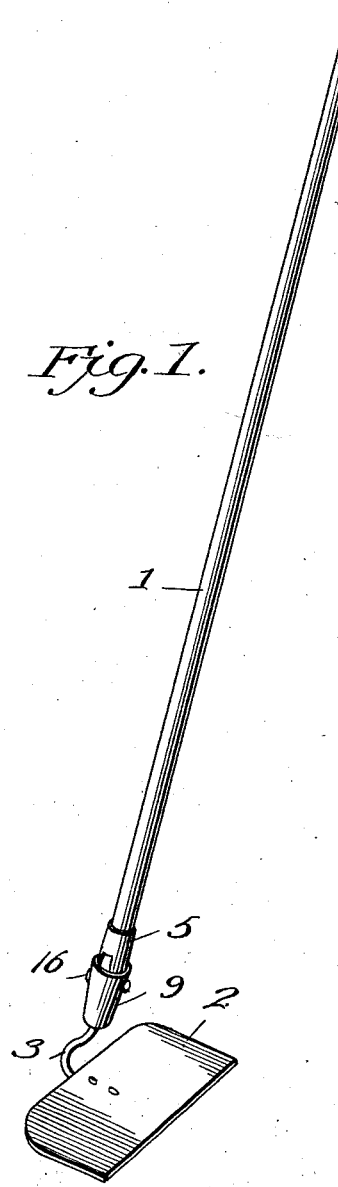
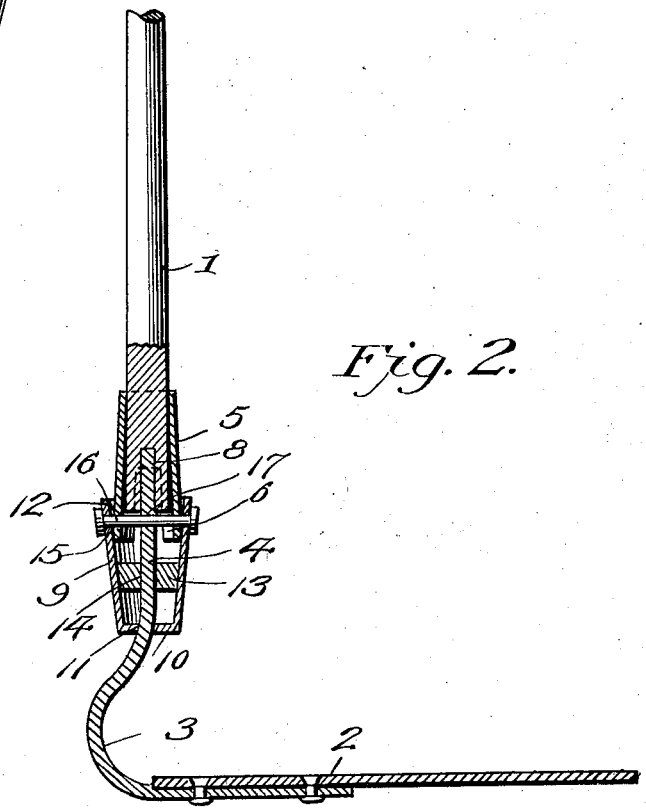
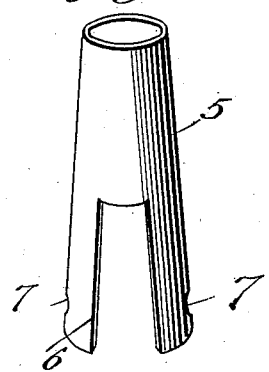
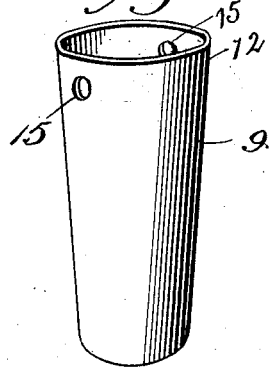
WITNESSES:
Geo. Ackman Jr.
Chas. S. Hoyer.
INVENTOR
George M. Bright,
BY
Victor J. Evans
Attorney No. 751,374. Patented February 2, 1904.

UNITED STATES PATENT OFFICE.

GEORGE MICHAEL BRIGHT, OF ABINGDON, VIRGINIA.

FASTENING MEANS FOR HOES.

SPECIFICATION forming part of Letters Patent No. 751,374, dated February 2, 1904.

Application filed July 9, 1903. Serial No. 164,839. (No model.)

*To all whom it may concern:*

Be it known that I, GEORGE MICHAEL BRIGHT, a citizen of the United States, residing at Abingdon, in the county of Washington and State of Virginia, have invented new and useful Improvements in Fastening Means for Hoes or other Implements, of which the following is a specification.

This invention relates to a fastening means for a hoe or a like implement; and the primary object of the same is to replace the ordinary single ferrule usually employed in connecting the tangs of hoes and like implements to handles by means which materially strengthen the hoe construction at a weak point and obviate any tendency of the tang loosening in or becoming accidentally detached from its handle. In the present form of hoe securing or fastening means an elongated ferrule is forced over the handle to the full lower end of the latter to permit a hoe-tang to occupy a central position in the ferrule and enter the handle at such a point as to hold the tang in a straight line with relation to the center of the hoe. This ferrule is of such dimensions and has resiliency sufficient to allow it to be inserted in the end of a coupling-sleeve disposed on the tang of the hoe at a point below the engaged end of the handle, the projecting portions of the ferrule embraced by the upper end of the coupling-sleeve, together with the latter and the tang projecting through the center of said parts into the handle, being attached by a transverse coupling pin or rivet, so as to obstruct the slightest movement of the hoe in relation to the handle.

The invention also consists in the construction and arrangement of the several parts, which will be more fully hereinafter described and claimed.

In the drawings, Figure 1 is a perspective view of a hoe and handle embodying the features of the invention. Fig. 2 is a transverse vertical section through the hoe and the lower portion of the handle, showing the improved fastening means. Fig. 3 is a detail perspective view of a ferrule, forming part of the invention. Fig. 4 is a detail perspective view of a coupling-sleeve to connect with the ferrule.

Similar numerals of reference are employed to indicate corresponding parts in the several views.

The numeral 1 designates an ordinary form of handle, which may be of any suitable length and enlarged toward its lower extremity. In the present instance a hoe is shown attached to the handle, though it will be understood that the improved fastening means may be used in connection with other implements, and in the present instance the hoe comprises the usual blade 2, having a curved shank 3 centrally attached thereto and projecting upwardly from the back edge and continuing into a tang 4.

The fastening comprises an elongated ferrule 5, diverged toward its lower extremity and having opposite bifurcations or slots 6 extending longitudinally thereof and opening out through the lower end to render the said lower extremity of the ferrule slightly resilient and compressible. Near the lower end of the ferrule, in a plane at right angles to the oppositely-disposed bifurcations or slots 6, openings 7 are formed for a purpose which will be presently explained. The lower enlarged end of the handle 1 is formed with a longitudinally-extending central socket 8 to receive the terminal of the tang 4, and when the ferrule 5 is applied to the handle 1 the lower enlarged extremity thereof projects below the end of said handle and the upper reduced extremity closely binds on the handle, as clearly shown by Fig. 2. A coupling-sleeve 9 is used as a part of the fastening and has a lower practically closed end 10 with a central opening 11 and an upper diametrically-enlarged extremity 12 of greater dimension than the lower enlarged extremity of the ferrule 5. Within the coupling-sleeve 9, at an elevation above the bottom 10, is a centering-plug 13, having a central opening 14, and the upper enlarged end of said sleeve is formed with opposed openings 15 to receive a coupling-pin or rivet 16, which is also passed through the openings 7 in the lower end of the ferrule and through an opening 17 in the tang 4.

In assembling the parts of the fastening the ferrule is slipped longitudinally over the handle 1 from the small end of the latter and driven firmly into place at the lower enlarged end of said handle. The sleeve 9 is then applied and caused to embrace the lower projecting extremity of the ferrule 5, the openings 7 and 15 coinciding when the ferrule and sleeve are properly assembled. The hoe is then connected to the parts just described by inserting the tang 4 upwardly through the opening 11 in the bottom 10 of the sleeve 9, through the centering-plug 13, and into the socket 8, the opening 17 in the tang then being in transverse alinement with the openings 7 and 15 of the ferrule and sleeve. The coupling-pin or rivet 16 is then inserted through the assembled ends of the ferrule and sleeve and the tang and headed at opposite terminals against the exterior surface of the sleeve. When the tang 4 is thus secured to the handle, it will be held in a straight line in relation to the center of the hoe, and movement in a rearward direction over the handle will be obviated in view of the binding action set up between the lower extremity of the ferrule and the lower enlarged end of the handle, and a forward movement of the hoe and its tang will be obstructed by the ferrule 5. In other words, after the parts set forth have been associated and connected the hoe will be prevented from having loose movement in any direction and will always remain firmly connected to the handle.

It will be seen that the improved fastening strengthens the tang by bracing it at an intermediate point and the disadvantages incident to the ordinary method of attaching hoe tangs or shanks to handles will be overcome. Changes in the proportions, dimensions, and minor details may be resorted to without departing from the spirit of the invention.

Having thus fully described the invention, what is claimed as new is—

1. The combination of a handle having a socket in one end thereof, an implement having a tang to fit in the socket, a ferrule embracing the end of the handle having the socket therein and projecting beyond said end, a coupling-sleeve fitted over the projecting end of the ferrule, the tang extending centrally through the sleeve, and a coupling-rivet inserted transversely through the associated portions of the ferrule and sleeve and the tang.

2. A handle, having an enlarged extremity with a socket extending longitudinally thereof, a ferrule applied to the enlarged end of the handle and having a bifurcated diverged extremity, a coupling-sleeve having the upper portion thereof embracing the lower end of the ferrule, a hoe having a tang projecting upwardly through the sleeve and ferrule into the socket of the handle, and a connecting means passing transversely through the engaged portions of the ferrule and sleeve and the tang.

3. A handle, having an enlarged extremity with a central longitudinally - extending socket, a ferrule applied over the handle and firmly engaging the enlarged socketed end of the latter, a coupling-sleeve having its upper extremity embracing the lower end of the ferrule, a centering-plug in the sleeve, a hoe having a tang projecting upwardly through the sleeve, its centering-plug, and the lower extremity of the ferrule and extending into the said socket, and a transverse connecting means inserted through the engaged portions of the ferrule and sleeve and the tang.

4. A handle, having a socket in one end, a ferrule on the end of the handle having the socket therein, a coupling-sleeve engaging the ferrule, and a hoe having a tang projecting through the sleeve into the socket and connected to said parts, whereby the tang is held in a straight line with relation to the center of the hoe.

5. A fastening device of the class set forth, consisting of a ferrule and sleeve terminally engaging each other and having a coupling-pin projecting therethrough, combined with a handle having one end held in the ferrule and provided with a socket, and a hoe having a tang projecting through the sleeve and ferrule into the socket and engaged by said means.

6. A fastening for implements, consisting of a ferrule, a sleeve terminally embracing one extremity of the ferrule, and a transversely-extending coupling-pin for the engaged extremities of the ferrule and sleeve, combined with a handle having one end held in the ferrule and provided with a socket, and a hoe having a shank extending upwardly through the sleeve and ferrule into the socket and engaged by the said pin.

In testimony whereof I affix my signature in presence of two witnesses.

GEORGE MICHAEL BRIGHT.

Witnesses:
J. W. BELL,
L. P. BOOKER.